April 22, 1930.   S. M. KASS   1,755,603
PROTECTIVE SUPPORT FOR USE WITH GAS STOVES
Filed Sept. 20, 1927
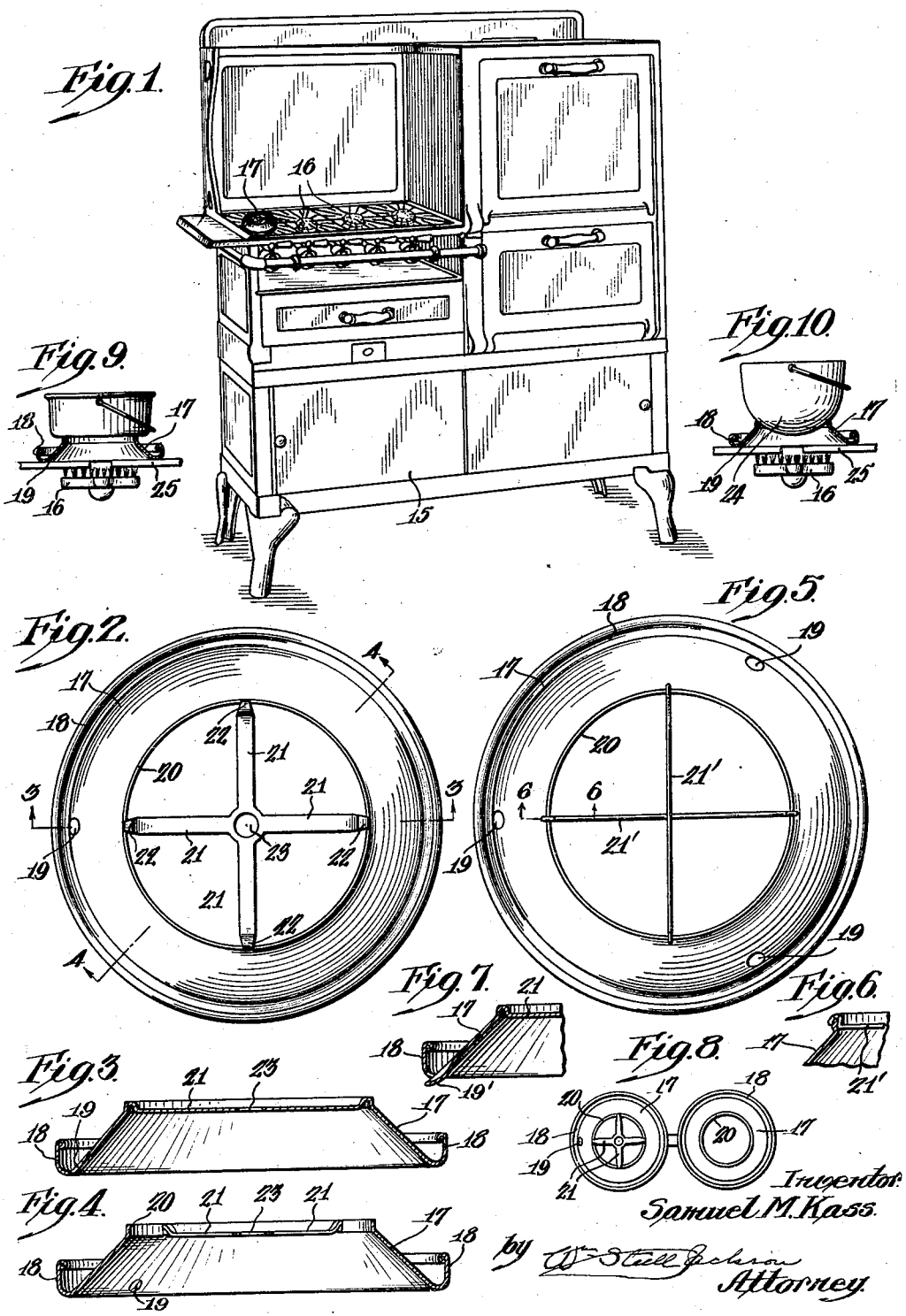

Patented Apr. 22, 1930

1,755,603

UNITED STATES PATENT OFFICE

SAMUEL M. KASS, OF PHILADELPHIA, PENNSYLVANIA

PROTECTIVE SUPPORT FOR USE WITH GAS STOVES

Application filed September 20, 1927. Serial No. 220,662.

My invention relates to a safety device for use under pots while cooking with gas.

A purpose of my invention is to eliminate all danger of extinguishing the gas under a pot from any boiling over of the contents of the pot. I shield the flame from the flood of liquid that runs down the outside of a pot when the pot inadvertently boils over. This overflow has hitherto usually struck the burner, often extinguishing the flame.

A further purpose is to support a pot over a gas flame upon a hollow truncated cone having a supporting top smaller than the bottom of the pot and having a catch gutter around its base. This catch gutter may be perforated to pass any liquid overflowing from the pot into a space away from the burner, or it may be made without perforation and sufficiently large in content to catch and retain the boiled-over liquid, thus keeping the gas range clean.

I may provide the top of the cone with cross connections protecting against tilting of the pots when they are slightly displaced laterally, or may leave it without these connections for better adaptation to use with round bottom pots.

A further purpose is to provide a composite form for use at a plurality of burners simultaneously, made up of two or more cone supports fastened together, spaced like the burners, and desirably individually different for better accommodation to different kinds of pots at the different burners.

Further purposes will appear in the specification and in the claim.

I have elected to show a few only of the many forms of my invention selecting forms that are efficient and practical in operation and which well illustrate the principles involved.

Figure 1 is a perspective view illustrating my invention in position upon a gas range.

Figure 2 is an enlarged top plan view of one form of my invention.

Figure 3 is a section taken upon the line 3—3 of Figure 2.

Figure 4 is a section taken upon the line 4—4 of Figure 2.

Figure 5 is a top plan view of a different form.

Figure 6 is a fragmentary section upon the line 6—6 of Figure 5.

Figure 7 is a fragmentary section corresponding to a portion of Figure 3 but showing a minor modification.

Figure 8 is a top plan view to reduced scale of a composite form for use simultaneously over a plurality of burners.

Figures 9 and 10 are fragmentary elevations showing slightly different forms in position of use under flat and round bottom pots respectively.

Describing in illustration and not in limitation and referring to the drawings:—

Prior to my present invention it has often happened that a gas flame under a pot has been extinguished when the pot has inadvertently boiled over, a rush of liquid down the outside of a pot striking the burner and putting out the flame. When this has happened with no one at hand there has been an escape of gas into the room that has at times endangered life and property, and my invention is designed to correct this evil and danger.

I shield the burner and gas flame from any overflowing liquid by means of an upwardly converging hollow stand that surrounds the burner.

The upper end of the shielding stand loosely seals circumferentially against the bottom of the pot and diverts any boiling-over liquid down the stand to a catch gutter, the stand supporting the pot and its seal with the bottom of the pot being a sufficiently loose one to let pass outwardly a considerable portion of the hot products of combustion.

In Figure 1 the gas range 15 having usual burners 16 is shown with one of my safety stands 17 over one of the burners in position to receive a pot.

The safety stand 17 comprises a hollow truncated cone having a base turned outwardly and upwardly to form an annular gutter 18.

The bottom of the gutter 18 may have one or more perforations 19 to permit easy escape of any liquid caught in the gutter, or may be left tight. In the one case the boiling over liquid is guided to the gutter and thence without engaging the burner passes down into the drip pan normally present beneath the burners of a gas stove and in the other case it is retained in the gutter until removed, which is usually done by lifting the stand away and washing out the gutter at the sink.

Where perforations are provided the bottoms of the perforations are most desirably formed as downwardly and outwardly extending gutters to discharge the liquid away from the flame, as shown at 19' in Figure 7.

Providing the bottom of the gutter with one or more perforations is obviously optional. I show one perforation in Figure 2, three perforations in Figure 5, and no perforations in the gutter of one of the stands of Figure 8.

The top 20 of the cone which receives the pot is preferably of internal diameter smaller than that of the bottom of the pot with which it is to be used.

I find it often desirable to provide the top of the stand with cross connections 21 which prevent tilting of a pot or pan if it be displaced laterally, and also transversely strengthen the cone making it better able to maintain its circular shape.

In the form of Figure 2 the whole stand is made from a single sheet of metal stamped to form.

The ends of the transverse connections 21 may be desirably made of reduced width at 22 where they connect with the top of the cone in order to lessen a tendency for overflowing liquid to run inward at these points of connection. Desirably also the middle of the transverse connection is provided with a central opening 23 to give the gas flame direct access to the middle of the bottom of the pot.

In Figure 5 the transverse strips 21' are of different material from the top of the stand and are shown as metal rods crimped at the ends at 22 over the top of the cone, being suitably recessed so that the top of the hook portion of the rod is substantially even with the rest of the top of the cone.

When the stand is to be used with round bottom pots I may omit the transverse connections across the top, or place them sufficiently beneath the top to permit a round bottom pot to sit inside the stand.

This is illustrated in Figure 10 where the round bottom pot 24 fits into the top of a stand 17. The stand is supported above a burner 16 upon the grating 25 of the stove.

When used with round bottom pots the stand is advantageously made of light sheet metal, the top opening conforming reasonably closely to the circumference of the pot. Any overflow running down the outside of the pot is guided away by the cone from striking the burner.

In many cases it may be desirable to fasten two or more of the stands together, as illustrated in Figure 8, with a spacing corresponding to that of the burners with which the stands are to be used.

The composite form is made up of any desired number of stands suitably connected together to register above the burners with which they are to be used.

If desired one or more of the stands of the combined unit may be provided with the cross connections 22 at the top for better adaptation for use with very small pots and another stand or stands of the unit provided with an open top for better adaptation to use with round bottom pots.

In view of my invention and disclosure variations and modifications to meet individual whim or particular need will doubtless become evident to others skilled in the art, to obtain all or part of the benefits of my invention without copying the structure shown.

Having thus described my invention, what I claim as new and desire to secure by Letters Patent is:

A safety device for supporting a pot above the gas burner and shielding the burner from any liquid boiling over from the pot comprising an upwardly and inwardly converging hollow cone support and a catch gutter about the base of the support, the catch gutter being perforated at the bottom and the bottom of the perforation being bent downwardly and outwardly to direct the liquid to flow outwardly away from the flame.

SAMUEL M. KASS.